(12) United States Patent
Lam et al.

(10) Patent No.: US 8,876,056 B2
(45) Date of Patent: Nov. 4, 2014

(54) AIRCRAFT FUEL SYSTEM

(75) Inventors: Joseph K-W Lam, Bristol (GB); Franklin Tichborne, Bristol (GB); Simon Masters, Bristol (GB); David Parmenter, Uckfield (GB)

(73) Assignee: Airbus Operations Limited, Bristol (GB)

( * ) Notice: Subject to any disclaimer, the term of this patent is extended or adjusted under 35 U.S.C. 154(b) by 155 days.

(21) Appl. No.: 12/897,870

(22) Filed: Oct. 5, 2010

(65) Prior Publication Data

US 2011/0084171 A1   Apr. 14, 2011

(30) Foreign Application Priority Data

Oct. 13, 2009   (GB) .................................. 0917879.9

(51) Int. Cl.
*B64D 37/34* (2006.01)
*B64D 15/12* (2006.01)
*B64D 37/32* (2006.01)

(52) U.S. Cl.
CPC ................ *B64D 37/34* (2013.01); *B64D 37/32* (2013.01)
USPC ................ 244/135 R; 244/134 R; 244/134 D

(58) Field of Classification Search
USPC .................... 244/135 R, 135 A, 134 D, 134 R
See application file for complete search history.

(56) References Cited

U.S. PATENT DOCUMENTS

| 2,456,012 | A | * | 12/1948 | Morris et al. ................ 324/629 |
| 3,292,855 | A | * | 12/1966 | Wright ............................ 431/12 |
| 3,412,699 | A | * | 11/1968 | Culp et al. ................ 110/101 R |
| 3,498,112 | A | * | 3/1970 | Howard ...................... 73/61.48 |
| 3,627,239 | A | * | 12/1971 | Hull, Jr. ..................... 244/135 R |
| 4,060,212 | A | * | 11/1977 | Magenheim .............. 244/134 D |
| 4,230,448 | A | * | 10/1980 | Ward et al. .................... 431/208 |
| 4,365,131 | A | * | 12/1982 | Hansman, Jr. ............ 244/134 D |
| 4,453,125 | A | * | 6/1984 | Kimura et al. ................ 324/632 |
| 4,505,124 | A | * | 3/1985 | Mayer ....................... 244/135 R |
| 4,776,536 | A | * | 10/1988 | Hudson et al. ............ 244/135 R |
| 5,061,836 | A | * | 10/1991 | Martin ...................... 244/134 D |
| 5,313,202 | A | * | 5/1994 | Hansman et al. ......... 244/134 R |
| 5,615,849 | A | * | 4/1997 | Salisbury .................. 244/134 R |
| 5,673,554 | A | * | 10/1997 | DeFreitas et al. .......... 60/39.821 |
| 5,689,949 | A | * | 11/1997 | DeFreitas et al. .............. 60/776 |
| 5,845,480 | A | * | 12/1998 | DeFreitas et al. .............. 60/776 |

(Continued)

FOREIGN PATENT DOCUMENTS

| CN | 101319644 A | 12/2008 |
| RU | 2225807 C2 | 3/2004 |

OTHER PUBLICATIONS

British Search Report for GB0917879.9 dated Jan. 28, 2010.

(Continued)

*Primary Examiner* — Tien Dinh
*Assistant Examiner* — Steven Hawk
(74) *Attorney, Agent, or Firm* — Lowe Hauptman & Ham, LLP

(57) ABSTRACT

An aircraft fuel system including a fuel line for carrying liquid fuel, and a microwave energy transmitter for energizing water carried in the fuel line. Also, a method of suppressing ice formation in an aircraft fuel system, the fuel system including a fuel line carrying liquid fuel, and a microwave energy transmitter, the method comprising transmitting microwaves along the fuel line to energize water carried with the fuel in the fuel line.

14 Claims, 2 Drawing Sheets

(56) References Cited

U.S. PATENT DOCUMENTS

| | | | | |
|---|---|---|---|---|
| 6,207,940 | B1* | 3/2001 | Feher et al. | 244/134 D |
| 6,426,124 | B2* | 7/2002 | Olster et al. | 427/487 |
| 6,440,317 | B1* | 8/2002 | Koethe | 244/135 R |
| 6,610,969 | B2* | 8/2003 | Feher | 244/134 R |
| 6,642,490 | B2* | 11/2003 | Feher | 244/134 R |
| 6,650,280 | B2* | 11/2003 | Arndt et al. | 342/124 |
| 6,787,744 | B1* | 9/2004 | Feher et al. | 244/134 R |
| 6,918,366 | B2* | 7/2005 | Schmidt et al. | 123/143 B |
| 7,213,580 | B1* | 5/2007 | Beyer et al. | 123/509 |
| 7,237,435 | B2* | 7/2007 | Motzer et al. | 73/290 R |
| 7,441,725 | B2* | 10/2008 | Botura et al. | 244/134 D |
| 7,629,497 | B2* | 12/2009 | Pringle | 585/241 |
| 2002/0101373 | A1* | 8/2002 | Arndt et al. | 342/124 |
| 2007/0131591 | A1* | 6/2007 | Pringle | 208/402 |
| 2008/0314730 | A1* | 12/2008 | Pringle | 204/157.6 |
| 2010/0025304 | A1* | 2/2010 | Everleigh et al. | 208/402 |
| 2010/0069688 | A1* | 3/2010 | Pringle et al. | 585/1 |
| 2010/0092350 | A1* | 4/2010 | Pringle et al. | 422/186 |
| 2010/0096295 | A1* | 4/2010 | Pringle et al. | 208/14 |
| 2010/0111780 | A1* | 5/2010 | Pringle et al. | 422/186 |

OTHER PUBLICATIONS

Dr Rakesh Roshan, Smart Active Microwave Cavity Sensors for Medical and Non-Medical Applications, ISIS Project No. 3152.

Berenice Baker, Microwave measurement, The Engineer, Technology News, Jun. 15, 2009.

* cited by examiner

AIRCRAFT FUEL SYSTEM

RELATED APPLICATIONS

The present application is based on, and claims priority from, British Application Number 091879.9, filed Oct. 13, 2009, the disclosure of which is hereby incorporated by reference herein in its entirety.

FIELD OF THE INVENTION

The present invention relates to a method of suppressing ice formation in an aircraft fuel system, and apparatus therefor.

BACKGROUND OF THE INVENTION

The presence of water in aircraft fuel has been a topic of concern for the aviation industry for many decades, since any contaminating water may freeze during long flights at high altitudes. The resulting ice particles may block fuel filters or otherwise interfere with the steady flow of fuel to the engines, thereby creating a clear safety issue.

Fuel will absorb water and the quantity will depend on the ambient conditions such as temperature and humidity. The fuel will tend to precipitate any excess dissolved water when it is cooled to the temperatures prevailing at high altitudes. The excess water may then appear in the form of fine water droplets or as ice crystals.

The water that settles out from the fuel will contain small quantities of fuel or components of the fuel. It is known that at low temperatures, unusual complex crystalline structures can be formed with water and small hydrocarbon molecules. These are known as clathrates and they are reported to have a strong tendency to accrete, adhere to pipe walls and to be slow to dissociate.

Heat exchangers are commonly used to heat the fuel to prevent ice from building up in the aluminium tubes that feed fuel from the tanks to the wing mounted engines. Heat moves inward from the heated surface by conduction and convection to warm the fuel. The rate of heat transfer is limited and the heating is not uniform.

SUMMARY OF THE INVENTION

A first aspect of the invention provides an aircraft fuel system including a fuel line for carrying liquid fuel, and a microwave energy transmitter for energizing water carried in the fuel line.

A further aspect of the invention provides a method of suppressing ice formation in an aircraft fuel system, the fuel system including a fuel line carrying liquid fuel, and a microwave energy transmitter, the method comprising transmitting microwaves along the fuel line to energize water carried with the fuel in the fuel line.

The invention is advantageous in that the microwaves interact the with water to efficiently heat the water by a process known as dielectric heating. Water molecules are polar and hence rotate with the alternating field of the electromagnetic waves transmitted by the microwave transmitter along the fuel line. This molecular rotation causes interactions and collisions with adjacent water molecules thereby transferring energy to those adjacent molecules. By this process, the electromagnetic energy is converted into heat.

The invention takes advantage of the large difference in dielectric constant between the water and the fuel in the fuel line. The dielectric heating effect on the fuel and on the water is proportional to their respective dielectric constants. Aviation fuel has a dielectric constant of around 2, whereas water has a dielectric constant of around 80. The microwaves therefore preferentially heat up the water to prevent it from freezing to ice when the bulk fuel temperature drops below the water freezing point (approx. 0 degrees Celsius). Ice has a dielectric constant of around 4, and so any ice which does form will also be preferentially heated by the microwaves to melt it. The overall heating effect on the fuel/water mixture in the fuel line is minimal (perhaps a few degrees Celsius) leading to a far more energy efficient anti-icing/de-icing system than the prior art heat exchangers.

The transmitter may have an antenna disposed inside the fuel line. The antenna may be a dipole antenna.

The transmitter may be adapted to transmit at a wavelength tuned to the dimensions of the fuel line. In this way, the fuel line acts as a waveguide to maximise the efficiency of the system.

The fuel system may further comprise a microwave control system for controlling the output of the transmitter. The control system may include one or more microwave energy receivers. The or each receiver may have an antenna (preferably, a dipole antenna) disposed inside the fuel line. Preferably, two receivers are provided, one on either side of the transmitter. The transmitted energy will be partially absorbed by the water present in the fuel line. Energy that is not absorbed by the water, or elsewhere, will be present at the receiver(s). As the water content varies, the amount of energy absorbed by the water changes. Therefore, a signal from the receiver(s) may be used to measure and control the transmitted energy level, such that the transmitted energy is kept at an optimal level to suppress ice formation in the fuel line. In addition, the receivers prevent microwave leakage from the ends of the fuel line.

The control system may be adapted to maintain a substantially constant receive power level when the transmitter is operating. In this way, the heating effect remains constant. The amount of transmitted microwave energy is proportional to the amount of water in the fuel line such that the microwave energy per unit volume of water is constant. This ensures that the water is not heated up too rapidly by putting too much microwave energy per unit volume of water to cause high temperatures. When there is little or no water in the fuel line, the transmitted microwave energy would be very low so preventing energy wastage.

The control system may further comprise one or more temperature sensors for sensing the temperature of the fuel in the fuel line. The control system may be adapted to stop heating when the temperature of the fuel exceeds a predetermined threshold, as a safety measure. Furthermore, a low pressure valve may be installed in the fuel line, such that if the fuel pressure drops below a predetermined threshold the valve will shut. The microwave control system may be coupled to this low pressure valve such that the transmitter is disabled if the valve is shut, as a safety measure.

The fuel line having the transmitter may be fluidically connected between a fuel tank and an engine of the fuel system, as a direct replacement for the prior art heat exchangers. Alternatively the fuel line having the transmitter may be connected between fuel tanks of a multi-tank aircraft fuel system. Where the fuel line is connected to an engine, the microwave control system may be powered from the engine's generator. This provides a safety measure since if the engine stops then no power is supplied to the transmitter and no dielectric heating occurs.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
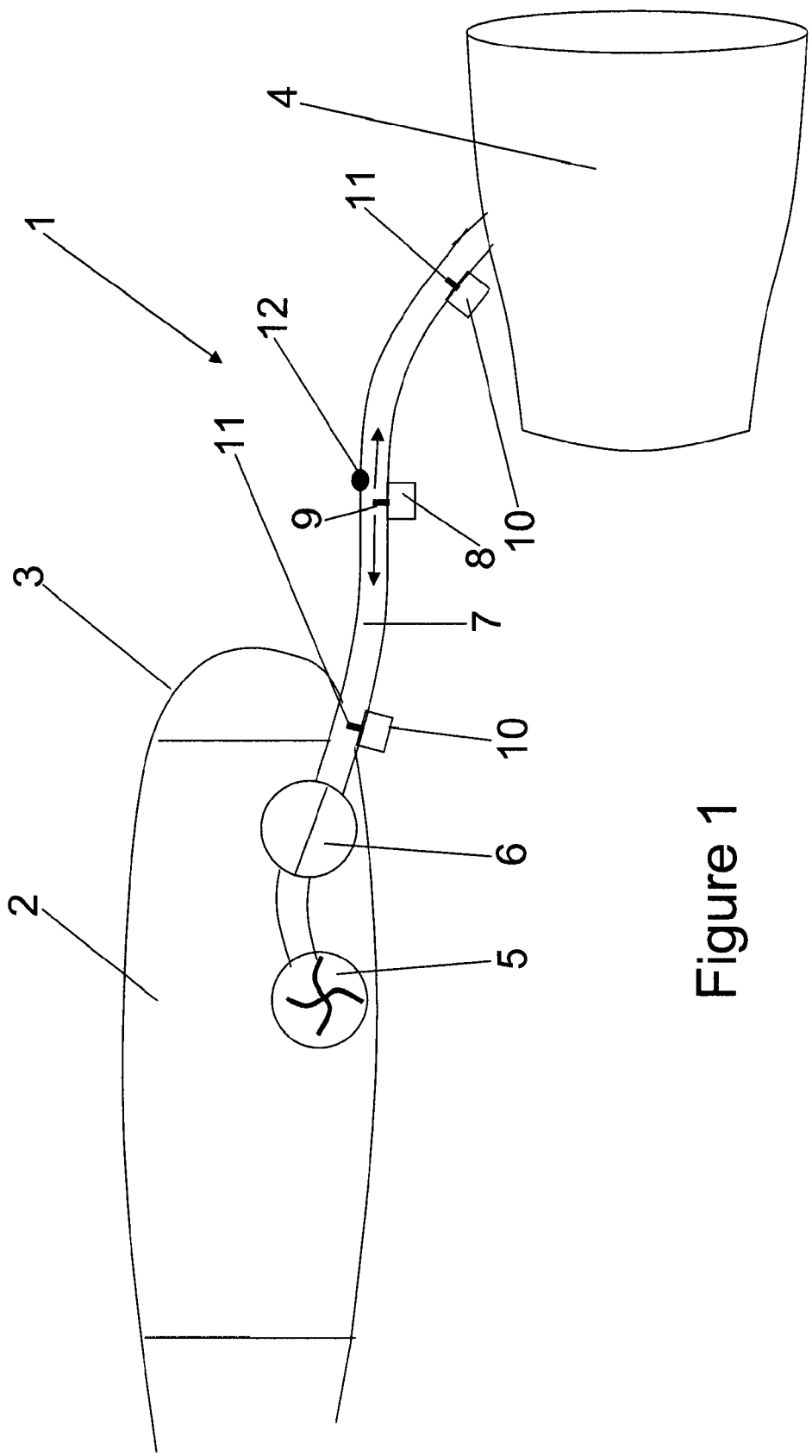
FIG. 1 illustrates a schematic view of an aircraft fuel system including the microwave transmitter.

FIG. 1 shows an aircraft fuel system 1 for supplying liquid fuel from a fuel tank 2 in the aircraft wing 3 to a jet engine 4. The fuel system 1 includes a fuel pump 5 installed in the tank 2, a low pressure valve 6 (shown in its open position in FIG. 1) and a fuel line 7. The fuel line 7 supplies liquid fuel from the tank 2 to the engine 4. The engine 4 is mounted from the aircraft wing 3 by a pylon (not shown) of conventional type and the fuel line 7 passes through the pylon. The above described features of the fuel system 1 are entirely conventional.

Figure 2:
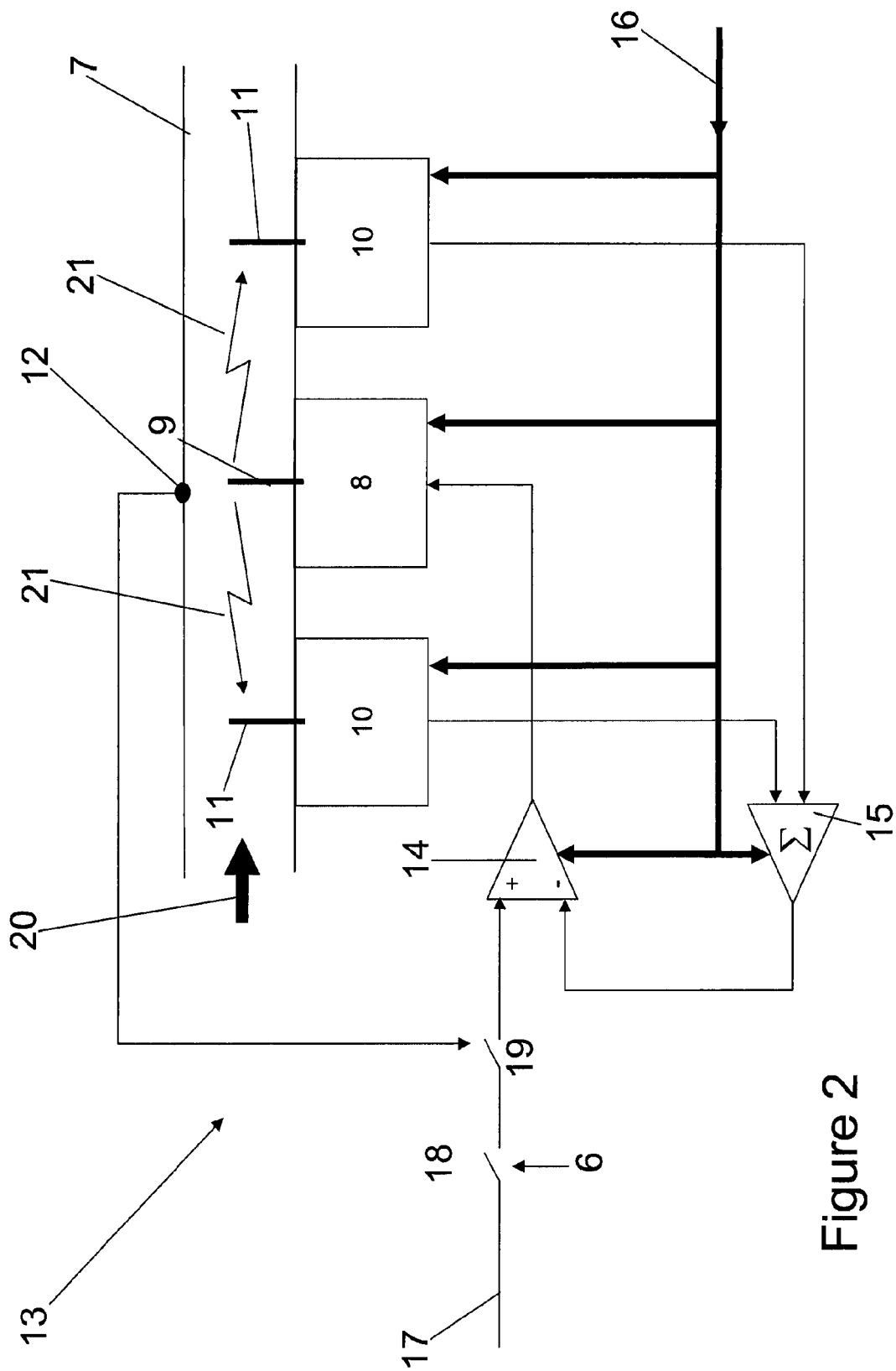
FIG. 2 illustrates a block diagram of a control system for the microwave transmitter.

As can be seen from FIG. 1, the fuel system 1 further includes a microwave transmitter 8 having a dipole antenna 9 disposed within the fuel line 7. At each end of the fuel line 7 (between the valve 6 and the engine 4) is disposed a microwave receiver 10 having a dipole antenna 11 inside the fuel line 7. Mounted in the wall of the fuel line 7 is a temperature sensor 12. The transmitter 8, receivers 10 and sensor 12 are connected by a control system 13 (not shown in FIG. 1), which will be described in detail with reference to FIG. 2.

The control system 13 includes a controller 14 and a summation circuit 15. The transmitter 8, receivers 10, controller 14 and summation circuit 15 are each supplied with electrical power from a power line 16. The power is supplied to the power line 16 from a dedicated generator associated with the engine 4. Each receiver 10 outputs an electrical signal to the summation circuit 15. The output of the summation circuit is electrically connected to one input of the controller 14. The controller 14 is connected to a power supply 17 via a low pressure valve interlock 18 and an excessive temperature interlock 19. The low pressure valve interlock 18 is connected to the lower pressure valve 6 such that the interlock 18 is closed when the valve 6 is open and is open when the valve 6 is closed. The excessive temperature interlock 19 is connected to the fuel temperature sensor 12 such that the interlock 18 is closed when the fuel temperature sensor 12 returns a temperature that is below or equal to a preset temperature, and is open when the fuel temperature sensor 12 returns a temperature above the preset temperature. The transmitter 8 is electrically connected to the output of the controller 14.

When the engine 4 is running fuel is pumped by the pump 5 from the tank 2 in the direction of arrow 20 along fuel line 7 to be consumed by the engine 4. When the pressure in the fuel line 7 is above a predetermined threshold due to the action of the pump 5 the low pressure valve 6 opens. In the event that the pressure in the fuel line 7 drops below the predetermined threshold then the low pressure valve 6 will close thus starving the engine 4 of a fuel supply. Only when the engine 4 is running, that is to say fuel is flowing in the direction of arrow 20 along fuel line 7, will the engine's generator (not shown) be supplying electrical power to power line 16. The microwave control system 13 is operable to cause the microwave energy transmitter 8 to transmit microwaves (generally indicated by arrows 21) through the fuel in the fuel line 7 by dielectric heating. Energising the water in the fuel in this way suppresses the formation of ice when the bulk fuel temperature drops below the water freezing point (approx. 0 degrees Celsius).

The microwave control system 13 controls the power output of the transmitter 8 using adaptive feedback control to ensure that the fuel/water mixture in the fuel line 7 is not heated to too high a temperature, and to ensure that the water is being optimally heated for the amount of water in the fuel line 7. When operating, the microwave energy 21 from the transmitter 8 is absorbed by the water in the fuel line 7. The greater the amount of water, the more energy is absorbed. The receivers 10 receive microwave energy that has not been absorbed by the water, or elsewhere. The receivers 10 also ensure the microwave energy does not leak from the ends of the fuel line 7. A signal from the receivers 10 is fed to the summation circuit 15 which outputs a summation signal which is fed back to the controller 14. The controller 14 maintains a constant receive power level when the transmitter 8 is operating. In this way, the power output of the transmitter is increased when the water content in the fuel line is high, and the power output of the transmitter 8 is decreased when the water content in the fuel line 7 is low. The receive power level can be predetermined for optimal heating such that the controller 14 backs off the transmitted power automatically when the water content is low.

If the rate of fuel flow in the direction of arrow 20 along the fuel line 7 is low then the temperature of the fuel/water mixture in the fuel line 7 may start to rise. If the fuel temperature exceeds a maximum predetermined threshold for safe operation of the microwave system then a signal from the temperature sensor 12 fed back to the excessive temperature interlock 19 will cause the interlock to open thus disabling power to the transmitter 8. This ensures safe operation of the microwave control system 13. If the pressure within the fuel line 7 drops below a predetermined threshold then the low pressure valve 6 will close causing the low pressure valve interlock 18 to open thus disabling the supply of power to the transmitter 8. This also ensures safe operation of the microwave control system 13.

The microwave system heats water when present in the fuel flowing in fuel line 7 to prevent accumulation of ice downstream in the engine 4 intake strainers. The microwave energy levels are designed to only marginally increase the fuel temperature, perhaps by a few degrees Celsius. The dielectric heating is most effective on water due to its high dielectric constant. However, should the water already have turned to ice, then the dielectric heating by the transmitted microwave energy 21 will still be more effective at heating the ice than heating the fuel since the dielectric constant of ice is approximately double that of aviation fuel. As soon as the ice starts to melt the rate of dielectric heating of the resulting water will rapidly increase.

The microwave heating system described above may be retro-fitted to an existing aircraft fuel system, or may be integrated in new fuel systems. In the embodiment described above, the microwave heating system is used to heat water carried in a fuel line which carries fuel from a wing fuel tank to an engine mounted from the wing by a pylon. It is beneficial to provide the microwave heating system here as the pylon through which the fuel line passes is exposed to low temperatures during high altitude cruise. In addition, this fuel line, which directly supplies the engine fuel intake, is perhaps the most critical part of the fuel system which needs to be kept substantially free of ice. However, this invention is not particularly limited to providing microwave heating to the fuel line immediately upstream of the engine. It is also contemplated that the microwave heating system may similarly be used on a fuel line connecting two fuel tanks within a multi-tank fuel system. Here too it is important that ice formation is adequately suppressed as an ice blockage in the fuel line connecting to fuel tanks may prohibit effective transfer of fuel between the fuel tanks.

Although the invention has been described above with reference to one or more preferred embodiments, it will be appreciated that various changes or modifications may be made without departing from the scope of the invention as defined in the appended claims.

The invention claimed is:

1. An aircraft fuel system including a fuel line for carrying liquid fuel, a microwave energy transmitter attached to the outside of the fuel line and having an antenna disposed inside the fuel line for energizing water carried in the fuel line, and a microwave control system for controlling the output of the transmitter, wherein the microwave control system further includes a microwave energy receiver attached to the outside of the fuel line and having an antenna disposed inside the fuel line for receiving not absorbed microwave energy.

2. A fuel system according to claim 1, wherein the transmitter is adapted to transmit at a wavelength tuned to the dimensions of the fuel line.

3. A fuel system according to claim 1, wherein the control system includes a plurality of microwave energy receivers.

4. A fuel system according to claim 3, wherein each of said plurality of microwave energy receivers has an antenna disposed inside the fuel line.

5. A fuel system according to claim 3, wherein two of said plurality of microwave energy receivers are provided, one on either side of the transmitter.

6. A fuel system according to claim 3, wherein the control system is adapted to maintain a substantially constant receive power level when the transmitter is operating.

7. A fuel system according to claim 1, wherein the control system includes one or more temperature sensors for sensing the temperature of fuel in the fuel line.

8. A fuel system according to claim 7, wherein the control system is adapted to turn off the transmitter when the fuel temperature exceeds a predetermined threshold.

9. A fuel system according to claim 1, wherein the fuel line is fluidically connected between fuel tanks, or between a fuel tank and an engine of the fuel system.

10. A method of suppressing ice formation in an aircraft fuel system, the fuel system including a fuel line carrying liquid fuel, and a microwave energy transmitter attached to the outside of the fuel line and having an antenna disposed inside the fuel line, and at least one microwave energy receiver attached to the outside of the fuel line and having an antenna disposed inside the fuel line, the method comprising transmitting microwaves along the fuel line to energize water carried with the fuel in the fuel line, receiving not absorbed microwave energy at the receiver, and feedback control of the transmitted microwave energy, wherein the feedback control receives input from said at least one microwave energy receiver.

11. A method according to claim 10, wherein the feedback control receives input from one or more temperature sensors for maintaining the fuel temperature below a predetermined threshold.

12. A method according to claim 10, wherein the feedback control receives input from said at least one microwave energy receivers for maintaining a substantially constant receive power level when the transmitter is operating.

13. A fuel system according to claim 1, wherein the fuel line has an interior wall which provides a waveguide for guiding the microwave energy directed into the fuel line by the microwave energy transmitter.

14. A method according to claim 10, wherein the fuel line has an interior wall which provides a waveguide for guiding the microwave energy directed into the fuel line by the microwave energy transmitter.

* * * * *